(No Model.)

J. BLOEDEL.
DRAFT ATTACHMENT FOR HARNESS.

No. 301,331. Patented July 1, 1884.

WITNESSES
F. L. Ourand,
L. L. Miller,

INVENTOR
Jacob Bloedel,
per Chas. H. Fowler
Attorney

UNITED STATES PATENT OFFICE.

JACOB BLOEDEL, OF WYANDOTTE, KANSAS.

DRAFT ATTACHMENT FOR HARNESS.

SPECIFICATION forming part of Letters Patent No. 301,331, dated July 1, 1884.

Application filed April 26, 1884. (No model.)

*To all whom it may concern:*

Be it known that I, JACOB BLOEDEL, a citizen of the United States, residing at Wyandotte, in the county of Wyandotte and State of Kansas, have invented certain new and useful Improvements in Draft Attachments for Hames; and I do hereby declare that the following is a full, clear, and exact description of the same, reference being had to the annexed drawings, making a part of this specification, and to the letters and figures of reference marked thereon.

This invention relates to draft attachments for hames, and has for its object to so construct the hame and draft-hooks and connect or secure said parts together that the point of draft may be adjusted along said hames when desired.

It has for a further object to provide the draft-hooks with a spring-bearing, so as to relieve the animal from jars and sudden jolts, and thus make the draft easier.

With these ends in view, my invention consists in the novel construction, combination, and arrangement of the draft-hook, the pivoted loop or bail, the hames, and the straps with each other and together, substantially as hereinafter more fully described and claimed.

Figure 1:
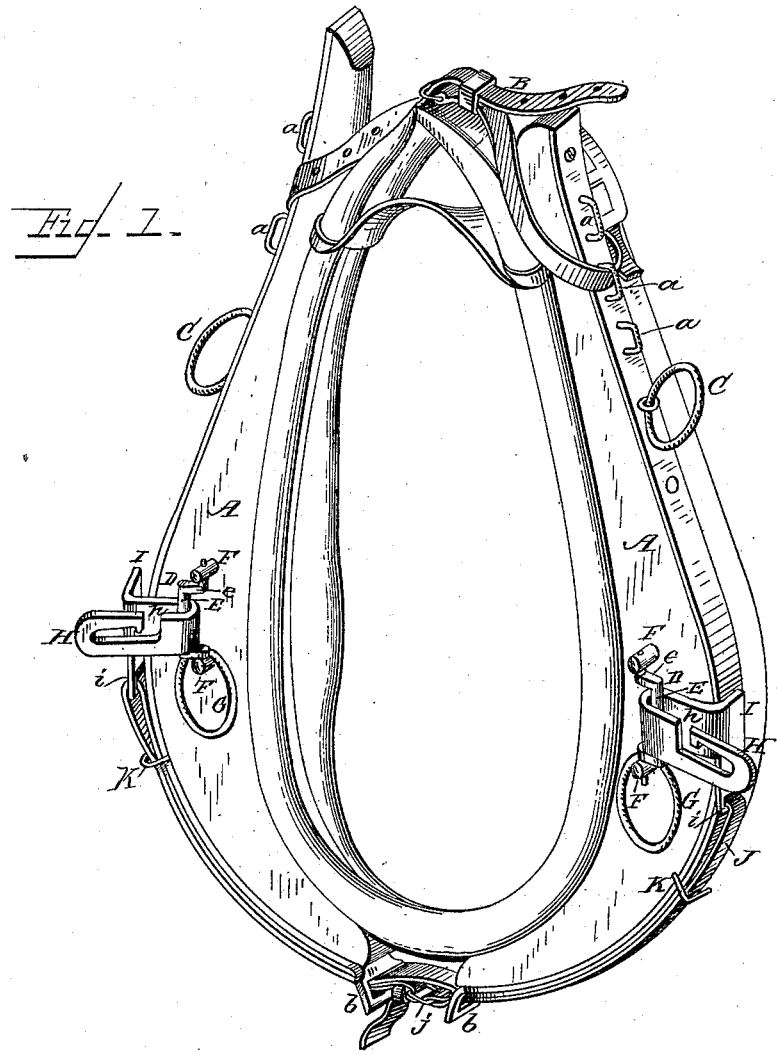
Figure 2:
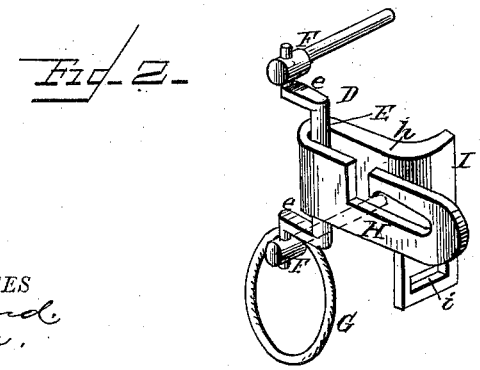

In the accompanying drawings, Figure 1 is a perspective view of a collar and hames provided with my improvements; and Fig. 2 is a detail view illustrating the draft-hook, loop or bail, and the pull-back ring in their relative positions.

The hames A A are provided near their upper ends with the usual staples, *a a*, to hold the hame-strap B, and these staples are arranged in vertical series, as shown, so the strap may be passed through one or the other, as the hames are used on different-sized collars. Keepers *b* are secured on the lower ends of the hames, to guide the fastening-strap, presently described. The hames may also be provided with the rein-rings C, as shown.

The loop or bail D is composed of the shaft or bar E and the arms *e*, extended from the opposite ends of the bar E, and pivoted at their outer ends to the hames, preferably in the pins F, as most clearly shown in Fig. 2. This bail D, it will be seen, is capable of a swinging movement on its pivots. The pull-back rings G are secured back of these bails, and rest down on the lower pin, F, in the manner clearly shown.

The draft-hook H is provided with the spring extension or wing *h*, bent from its rear end, and approximately parallel to the hook, except at the outer end, where the said wing is curved back, as shown, to form the edge flange, I. The lower end of flange I is preferably extended and perforated at *i*, to enable the connection of the fastening-straps, presently described. In operation the hook is passed through the bail and outward, the spring-wing bearing against the face of the hame, and the part or edge flange, I, resting against the edge or outer side of the hame, as shown in Fig. 1. I have only described one of these hame-hooks; but it will be understood one is used on each hame.

It will be noticed the draft-hooks are made of a width less than the loop or bail, so said hook can move up and down within the loop. The movement of the loop is governed by the tightness with which the strap J is drawn and fastened, the extent of movement of the draft-hook being but slight or sufficient to prevent any binding when the draft is applied. The strap J is passed through the apertures *i* in flanges I, and thence through keepers *b* on the ends of the hames, and connects the hames and the draft-hooks. This strap has its ends buckled at *j*, so it may be lengthened or shortened at will. Guide-hooks K are preferably used, being secured to the hames and extended back over the fastening-strap J at a point near the pivoted bails or loops.

By the described construction it will be seen that I provide a connection which can be easily and speedily adjusted to throw the draft at the proper point on different-sized animals, which is desirable for the reason it prevents galling of the neck and reduces the labor of pulling to a great extent. By adjusting the application of draft to the proper point the animal is able to use its weight to more advantage.

It is manifest that the draft-hook might be made without the edge flange, I, and the fastening-strap be secured directly to the outer end of the spring-wing, though I prefer to use said flange, because thereby I throw the strap on the edge or side of the hames, and it (the flange) also serves to steady the hook in proper position. It will also be understood that instead of the pivoted bail the hook may be secured through or on a rigidly-connected rod; but the pivoted bail is preferred because of the free movement before described.

In operation, it will be observed, by adjusting the fastening and hame straps, the hames can be fitted to any ordinary size of collar, and the draft-hook will adjust itself in the pivoted bail in such manner as to throw the point of application of strain on the proper line.

It will also be observed that by the construction shown of hames, draft-hooks, and fastening-strap the draft on said hooks serves to bind the hames tightly onto the collar.

My hames as described are simple, and can be made of any suitable material and at slight cost.

Having thus described my invention, what I claim, and desire to secure by Letters Patent, is—

The combination, with the hames provided at their lower ends with strap loops or keepers, of the draft-hooks secured and movable vertically on the hames, and the fastening-strap passed through the loops or keepers on the hames and secured at its opposite ends to the draft-hooks, substantially as set forth.

In testimony that I claim the above I have hereunto subscribed my name in the presence of two witnesses.

JACOB BLOEDEL.

Witnesses:
 LUTHER JONTZ,
 O. D. BURT.